United States Patent [19]

Hendrick

[11] Patent Number: 4,603,834
[45] Date of Patent: Aug. 5, 1986

[54] MOUNTING OF DISK IN A DISK VALVE

[75] Inventor: Fred W. Hendrick, Long Beach, Calif.

[73] Assignee: Smith International, Inc., Newport Beach, Calif.

[21] Appl. No.: 591,022

[22] Filed: Mar. 19, 1984

[51] Int. Cl.$^4$ .............................................. F16K 47/00
[52] U.S. Cl. ................................ 251/121; 137/625.31; 251/89
[58] Field of Search ................. 251/121, 215, 264, 89, 251/304, 310, 309, 311, 312, 314; 138/43, 45, 46; 137/625.3, 625.31, 454.5, 550, 270

[56] References Cited

U.S. PATENT DOCUMENTS

| | | |
|---|---|---|
| 1,014,766 | 1/1912 | Lytton . |
| 1,364,059 | 12/1920 | Jones . |
| 2,797,707 | 7/1957 | Hursh .............................. 251/121 X |
| 2,886,283 | 5/1959 | Natho . |
| 3,331,396 | 7/1967 | Willis . |
| 3,476,138 | 11/1969 | Doremus et al. ............... 251/149 X |
| 3,570,810 | 3/1971 | Kowalics . |
| 3,630,484 | 12/1971 | Taylor . |
| 3,831,621 | 8/1974 | Anthony et al. . |
| 3,834,416 | 9/1974 | Parkison . |
| 4,008,992 | 2/1977 | Johnson ......................... 251/121 X |
| 4,098,294 | 7/1978 | Woods . |
| 4,106,747 | 8/1978 | Malacheski et al. ................ 251/84 |
| 4,331,176 | 5/1982 | Parkison . |
| 4,360,040 | 11/1982 | Cove et al. . |

FOREIGN PATENT DOCUMENTS 413867 6/1946 Italy .

Primary Examiner—Larry Jones
Attorney, Agent, or Firm—Christie, Parker & Hale

[57] ABSTRACT

An orifice valve is disclosed comprising a valve body having a cylindrical upstream chamber, a downstream chamber having an oblong cross-sectional configuration adjoining and coaxial with the upstream chamber, and a shoulder comprising a pair of blind holes at the juncture of the upstream and downstream chambers. A downstream disk having a pair of fluid openings is mounted in the upstream chamber against the shoulder and comprises a pair of blind holes aligned with the blind holes in the shoulder. Rigid pins extend from the blind holes in the shoulder into the blind holes in the downstream disk to prevent rotation of the downstream disk. A rotatable upstream disk having a pair of fluid openings is mounted against the downstream disk and comprises a pair of blind holes. An operator member is provided comprising a forked turning member with a pair of tines, each having a blind hole in alignment with a blind hole in the upstream disk. Rigid pins extend from the blind hole in the upstream disk into the blind hole in the disk engaging member. The operator member comprises a handle exterior the valve body for rotating the forked turning member and upstream disk.

19 Claims, 5 Drawing Figures

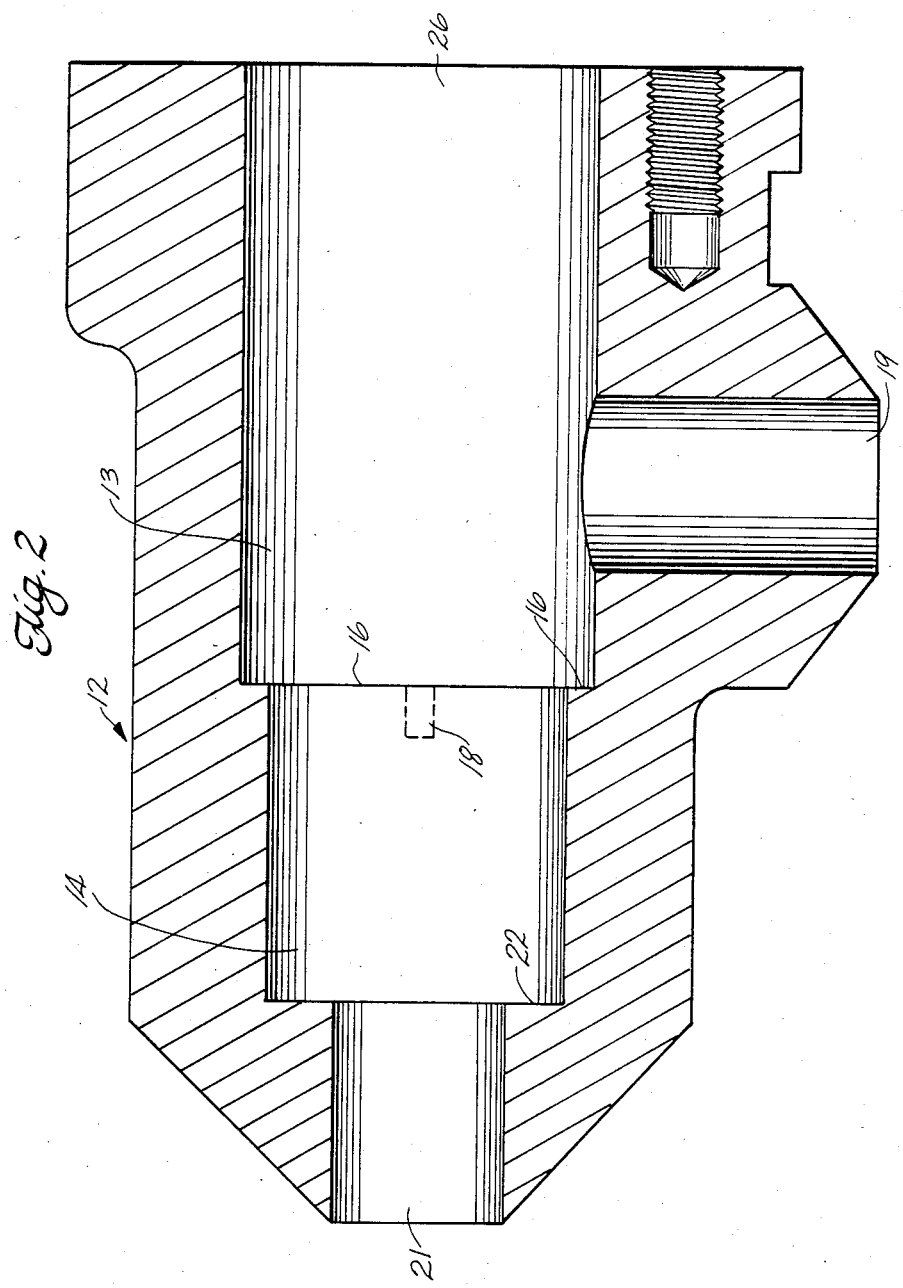

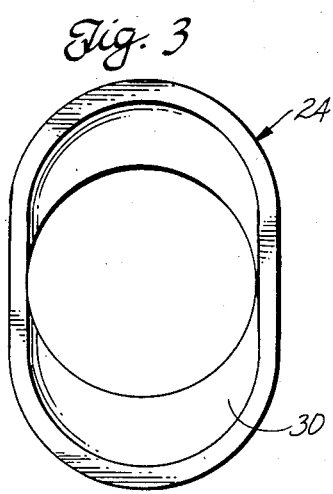
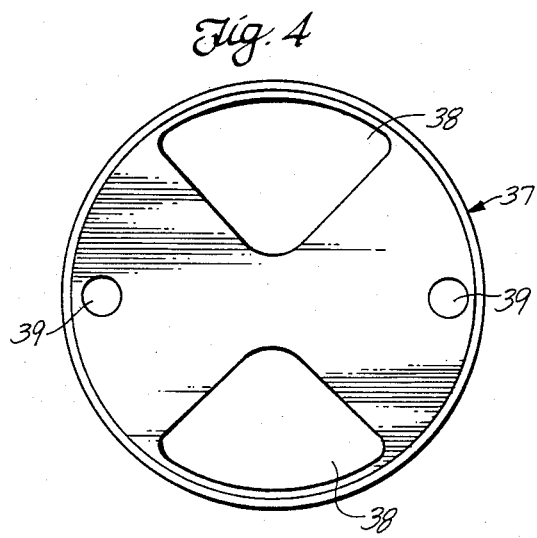
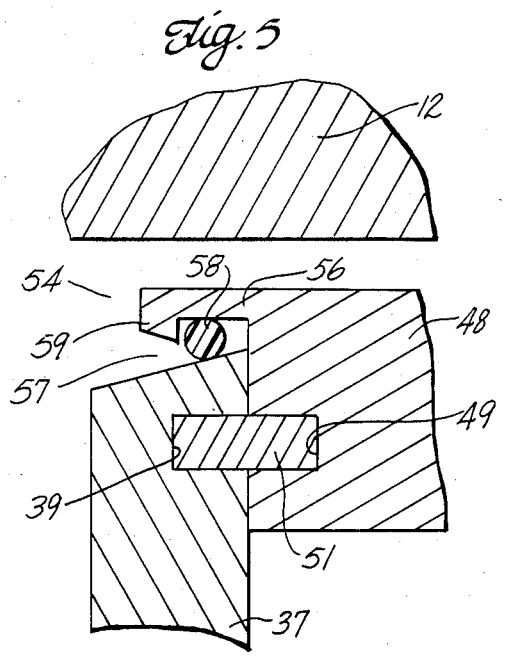

MOUNTING OF DISK IN A DISK VALVE

FIELD OF THE INVENTION

The present invention relates to orifice valves containing a stationary and a rotatable disk and more particularly to the means for mounting the disks in such an orifice valve.

BACKGROUND OF THE INVENTION

Orifice valves generally comprise a stationary disk and a rotatable disk mounted in face-to-face engagement across a fluid path in a valve body. Each disk has at least one hole or orifice.

The rate of flow through the orifice valve is in part determined by the number and size of holes in both the stationary disk and the rotatable disk and in the degree of alignment between those holes. The degree of alignment can be changed by angular movement of the rotatable disk. This is accomplished by turning a handle, outside of the valve body, which is coupled to the rotatable disk. The rotatable disk can be moved from a fully closed position for blocking flow through the valve to a fully opened position for providing maximum flow through the valve.

Orifice valves are particularly useful for controlling the flow of fluids produced from oil and gas wells and the like. For example, orifice valves are used to control the rate of flow of well production fluids through a flow line. Often, such fluids contain abrasive materials, such as sand particles, and are under extreme pressures. For example, a pressure of the fluid entering the valve of 3,000 psi is not uncommon.

The disks divide the fluid path within the valve body into an upstream chamber and a downstream chamber. The openings in the disks are of a smaller cross-sectional area than either the upstream chamber or the downstream chamber and, as a result, the fluid accelerates as it passes through the openings in the disks. Such an increase in velocity causes the disks to wear at a faster rate than the portion of the valve body upstream from the disks. The wall of the valve body downstream from the disks also tends to wear more rapidly than the wall of the valve body upstream from the disk because, when holes in the upstream disk and downstream disk are in partial alignment, the fluid flowing through the disks is directed toward the wall of the downstream chamber rather than along its length. As a result, the fluid impinges on the wall of the downstream chamber and abrasive material in the fluid erodes the wall.

To reduce erosion or wear, the disks are typically made of erosion resistant materials such as ceramic materials, e.g., aluminum oxide, or tungsten carbide. To reduce wear of the valve body downstream from the disks, a sleeve made of erosion resistant materials, such as tungsten carbide, is inserted into and lines the downstream chamber. However, in applications such as controlling the flow of well production fluids, the fluids are sufficiently abrasive to cause erosion of such disks and protective sleeves.

To avoid the replacement of the entire orifice valve, which is both time-consuming and expensive, the orifice valves are generally designed so that the disks and the protective sleeve are replaceable. Typically, the disks are fixedly mounted in upstream and downstream annular rings, generally referred to as disk carriers, e.g., as described in U.S. Pat. No. 3,207,181.

The downstream disk carrier generally extends the length of the downstream chamber between the protective sleeve and the wall of the valve body. In this arrangement, the downstream disk is fixedly mounted in the upstream end of the downstream disk carrier and the protective sleeve is inserted into the portion of the downstream disk carrier downstream from the disk. This forms a single unit which can be easily inserted and removed from the valve body. To prevent rotational movement of the downstream disk, the downstream disk carrier comprises a slot or notch which engages a boss or the like in the valve body.

To rotate the upstream disk, orifice valves typically comprise a forked turning member. Such a turning member has a shaft extending through the valve body and a pair of tines which extend to a position adjacent the upstream disk. A handle is at the end of the shaft for rotating the turning member.

The upstream disk is fixedly mounted in the upstream disk carrier which typically comprises a pair of slots or notches which engage the tines of the turning member so that when the turning member is rotated, the upstream disk carrier and, hence, the upstream disk is rotated.

The disk carriers are typically not subject to the same amount of erosive forces as the disks and, hence, are typically made of different and less expensive materials than the material of the disks. Various means, e.g., press fitting, suitable adhesives, braying, etc., are used to fixedly mount the disks in the disk carriers. However, in addition to requiring time and manpower to mount the disks in the disk carriers, the means for joining the disks and disk carriers occasionally fail, requiring a shutdown for their replacement.

SUMMARY OF THE INVENTION

The present invention provides an orifice valve comprising a valve body having an upstream chamber and a downstream chamber. The upstream chamber has a larger cross-sectional area than the downstream chamber, thereby forming a shoulder at the juncture of the upstream and downstream chambers. A pair of disks, a stationary downstream disk and a rotatable upstream disk, are mounted in the upstream chamber against the shoulder. The disks form a partition between the downstream chamber and the remainder of the upstream chamber. The disks have fluid openings which can be aligned for passage of fluid through the disks.

The shoulder comprises at least one blind hole which extends into the wall of the valve body defining the the downstream chamber. The downstream disk comprises at least one blind hole which is aligned with a blind hole in the shoulder. A rigid pin is disposed in the blind hole of the downstream disk and extends into the blind hole of the shoulder to prevent rotation of the downstream disk.

The upstream disk comprises at least one blind hole extending into the upstream disk from the face of the upstream disk remote from the downstream disk. The orifice valve further comprises means for rotating the upstream disk. The rotating means comprises a disk engaging member having at least one surface adjacent the upstream disk with a blind hole extending into the disk engaging member from said surface. At least one blind hole in the disk engaging member in the upstream disk is aligned with a blind hole. A rigid pin is disposed in the blind hole of the disk engaging member and extends into the blind hole of the upstream disk so that when the disk engaging member is rotated, the upstream disk is rotated. The rotating means preferably has a stem extending from the disk engaging member through the valve body. A handle is provided for manually rotating the disk engaging member and the upstream disk.

In a preferred embodiment, the valve body comprises a generally cylindrical upstream chamber and a downstream chamber having an oblong cross-section which is generally coaxial with the upstream chamber. The valve body has a generally cylindrical inlet port for introduction of fluid tthe upstream chamber and a generally cylindrical outlet port which is coaxial with the downstream chamber for egress of the fluid from the downstream chamber.

The downstream chamber is lined with an erosion resistant sleeve having generally oblong inner and outer cross-sectional perimeters adjacent the upstream chamber. Adjacent the outlet port, the sleeve has a generally oblong outer cross-sectional perimeter and a generally circular inner cross-sectional perimeter. The circular inner perimeter is about the same diameter as the diameter of the outlet port. The inner surface of the sleeve provides a smooth transition from the oblong cross-sectional configuration adjacent the upstream chamber to the circular cross-sectional configuration adjacent the outlet port.

The difference in cross-sectional configuration of the upstream and downstream chambers results in an annular shoulder generally normal to the longitudinal axis of the chambers, the shoulder having a generally circular outer perimeter and an oblong inner perimeter.

The shoulder comprises a pair of blind holes in communication with the upstream chamber generally at the two positions wherein the distance between the inner and outer perimeters of the shoulder are at a maximum. A downstream disk is mounted in the valve body and abuts the face of the shoulder. The downstream disk has a pair of blind holes in communication with the blind holes of the shoulder. A pair of pins extend from th blind holes of the shoulder into the blind holes of the downstream disk to prevent rotation of the downstream disk.

The diameter of the downstream disk is preferably less than that of the upstream chamber to provide a groove between the outer circumference of the downstream disk and the wall of the valve body defining the upstream chamber. An O-ring is preferably positioned in the groove for providing a seal between the valve body and the downstream disk.

An upstream disk is mounted in face-to-face engagement with the downstream disk and has a pair of blind holes which are open to the remainder of the upstream chamber, i.e., extend into the upstream disk from the face of the upstream disk remote from the downstream disk.

An operator member provided which comprises a forked turning member mounted in the upstream chamber. The forked turning member has a pair of tines extending to the face of the upstream disk at positions adjacent the blind holes of the upstream disk. Each tine has a blind hole which is aligned with a blind hole in the upstream disk. A rigid pin is disposed in the blind hole in the upstream disk and extends into the blind hole of the corresponding tine so that when the forked turning member is rotated, the upstream disk is rotated. The operator member has a handle outside of the valve body for manual rotation of the operator member and the upstream disk.

In a particularly preferred embodiment, the diameter of the upstream disk is less than the diameter of the upstream chamber. Each tine has an undercut extension extending between the outer circumference of the upstream disk and the wall of the valve body defining the upstream chamber. An O-ring is wedged between the undercut extensions and the upstream disk to prevent the upstream disk from disengaging the tines during assembly into the valve body.

BRIEF DESCRIPTION OF THE DRAWINGS

These and other features and advantages of the present invention will be better understood by reference to the following detailed description when considered in conjunction with the accompanyg drawings wherein:

FIG. 2 is a longitudinal cross-sectional view of the valve body of the valve shown in FIG. 1;

FIG. 3 is an end view of the protective sleeve;

FIG. 4 is an end view of the upstream disk; and

FIG. 5 is an enlarged fragmentary cross-sectional view showing the engagement of the upstream disk and the tine.

DETAILED DESCRIPTION

Figure 1:
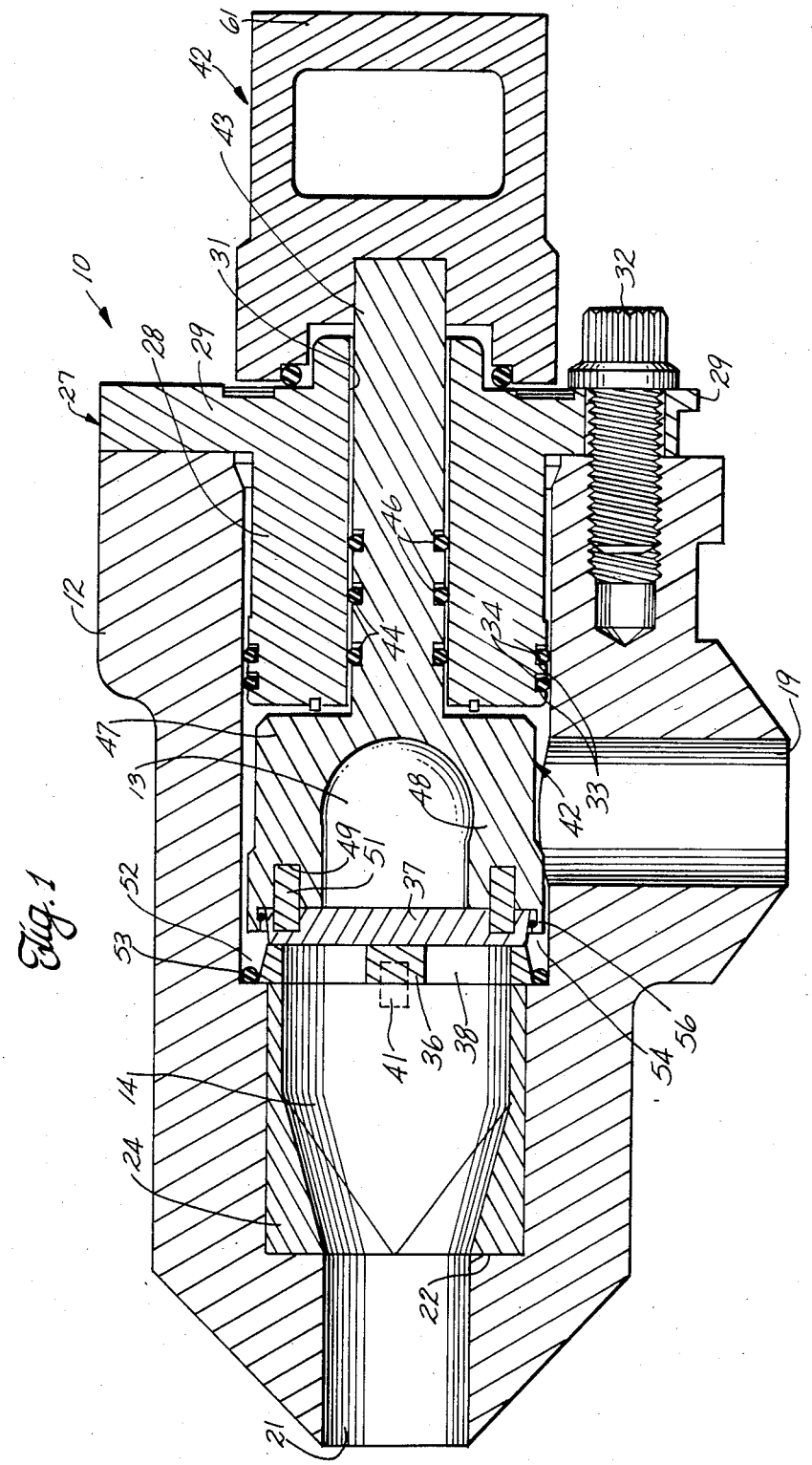
FIG. 1 is a longitudinal cross-sectional view of a preferred orifice valve.

Referring to FIGS. 1 and 2, there is shown a longitudinal cross-sectional view of a preferred orifice valve 10 made in accordance with the invention.

The orifice valve 10 comprises a valve body 12 having adjoining generally coaxial upstream and downstream chambers 13 and 14 respectively.

The upstream chamber 13 is generally cylindrical. The downstream chamber 14 has an oblong transverse cross-section and, in the orientation shown in FIG. 1, comprises generally flat vertical parallel side walls and curved top and bottom walls. The width of the downstream chamber 14, i.e., the distance from one side wall to the opposite side wall of the downstream chamber, is less than its height, i.e., the maximum distance from the bottom wall to the top wall. The height of the downstream chamber 14 is less than the diameter of the upstream chamber 13.

The difference in cross-sectional area and configuration between the upstream chamber and the downstream chamber results in a first shoulder 16 between the two chambers. The first shoulder 16 has a flat annular surface generally normal to the longitudinal axis of the upstream and downstream chambers. The shoulder 16 has a generally circular outer perimeter defined by the circular configuration of the upstream chamber 13 and an oblong inner perimeter corresponding to the configuration of the downstream chamber 14. The width of the shoulder 16 varies from a maximum, adjacent the mid-point of the side walls of the downstream chamber 14 to a minimum, adjacent the top and bottom walls of the downstream chamber.

The first shoulder 16 comprises a generally cylindrical blind hole 18 in communication with the upstream chamber 13 at each position where the width of the shoulder is at a maximum.

The orifice valve 10 further comprises a generally cylindrical inlet port 19 in communication with the upstream chamber 13 for introducing fluid into the valve body 12 and a generally cylindrical outlet port 21 in communication with the downstream chamber 14 for fluid egress from the valve body 12. In the exemplary embodiment shown, the inlet port 19 is generally normal to the axis of the upstream chamber 13 and the outlet port 21 is generally coaxial with the downstream chamber 14.

The diameter of the outlet port 21 is less than the width of the downstream chamber 14. This results in the formation of a second shoulder 22 between the downstream chamber 14 and the outlet port 21. The second shoulder 22 has a flat annular surface generally normal to the longitudinal axis of the downstream chamber. The second shoulder 22 has an oblong outer perimeter defined by the configuration of the downstream chamber 14 and a generally circular inner perimeter defined by the configuration of the outlet port 21.

A protective sleeve 24 is disposed in and lines the downstream chamber 14. The sleeve 24 is made of an erosion resistant material, such as tungsten carbide, and serves to protect the portion of the valve body 12 defining the downstream chamber 14 from wear.

The sleeve 24 extends the length of the downstream chamber, i.e., from a position adjacent the first shoulder 16 to a position abutting the second shoulder 22.

With reference to FIG. 3, the outer surface 25 of the sleeve 24 has an oblong outer cross-sectional configuration generally the same as the oblong cross-sectional configuration of the downstream chamber 14. At the end of the sleeve 24 adjacent the first shoulder 16, the inner surface 30 of the sleeve 24 also has an oblong cross-sectional configuration. At this end, the top, bottom and side walls of the sleeve 24 have a generally uniform thickness.

The sleeve 24 has a uniform wall thickness along its length from the end of the sleeve adjacent the first shoulder 16 to about the midpoint of the sleeve. From the midpoint, the thickness of the top and bottom walls of the sleeve gradually increase until, at the end of the sleeve abutting the second shoulder 22, the configuration of the inner surface 30 of the sleeve 24 is generally circular with a diameter about equal to the diameter of the outlet port 21.

Thus, the configuration of the inner surface 30 of the sleeve 24 is oblong adjacent the upstream chamber 13 and circular adjacent the outlet port 21. The sleeve 24 thereby provides a smooth gradual transition within the downstream chamber 14 from the upstream chamber 13 to the outlet port 21.

A pair of generally identical disks, a stationary downstream disk 36 and a rotatable upstream disk 37 are mounted in the upstream chamber 13 in face-to-face engagement and form a partition between the downstream chamber 14 and the portion of the upstream chamber 13 upstream from the disks.

With reference to FIG. 4, the downstream disk 36 and upstream disk 37 (not shown) each has a pair of diametrically opposed generally pie-shaped openings 38. The openings 38 are spaced from the outer circumference of the disk sufficiently to assure that the end of the sleeve 24 adjacent the downstream disk 36 does not block any portion of the openings 38.

The amount of fluid flow through the orifice valve 10 is controlled by the degree of alignment of the openings 38. That is, when the openings 38 of the downstream disk 36 do not overlap to any degree with the openings 38 of the upsream disk 37, i.e., the openings are completely out of alignment, fluid flow from the upstream chamber 13 to the downstream chamber 14 is blocked. When the openings 38 are in at least partial alignment, i.e., when at least portions of the openings 38 are superimposed, fluid introduced into the upstream chamber 13 through the inlet port 19 can flow through the openings 38 into the downstream chamber 14 and exit through the outlet port 21.

The disks are preferably composed of erosion resistant material. The erosion resistant material can be a ceramic, such as aluminum oxide or the like, or a material such as tungsten carbide. It is preferred that the material used for forming the disks have a hardness greater than about 8 on the Mohs scale.

The disks are flat and faing surfaces are smooth to provide ease of movement of the disks relative to each other and to provide a seal when the valve is closed. In an exemplary embodiment, the facing surface of each disk has an 8 microinch RMS finish.

Each disk has a pair of small diametrically opposed blind holes 39. The depth of the blind holes 39 is less than the axial thickness of either the downstream disk 36 or the upstream disk 37. The blind holes 39 extend inwardly from the face of each disk remote from the other disk.

The blind holes 39 in the downstream disk 36 have about the same diameter and are spaced apart generally the same distance as the blind holes 18 in the first shoulder 16. The downstream disk 36 is mounted in the upstream chamber 13 against the first shoulder 16 with the blind holes 39 in the downstream disk 36 aligned with the blind holes 18 in the first shoulder 16.

A pair of generally cylindrical rigid pins 41 each having a diameter about the same as the diameter of the blind holes in the first shoulder 16 and the downstream disk 36 are fitted in the blind holes 18 of the first shoulder 16 and extend outwardly from the first shoulder 16 into the blind holes 39 of the downstream disk 36, thereby preventing rotation of the downstream disk 36.

The diameter of the downstream disk 36 is less than the diameter of the upstream chamber 13. This results in a groove 52 between the outer circumference of the downstream disk 36 and the wall of the valve body 12 defining the upstream chamber 13. The diameter of the face of the downstream disk 36 abutting the first shoulder 16 is greater than the diameter of the face of the downstream disk 36 remote from the first shoulder 16 resulting in a taper of the outer circumference of the downstream disk 36. As a result of this taper, the groove 52 converges toward the first shoulder.

An O-ring 53 having a transverse cross-sectional diameter greater than the minimum width of the groove 52, i.e., the width of the groove 52 at the face of the first shoulder 16, is positioned in the groove 52 and forms a seal between the valve body 12 and the downstream disk 36.

The upstream disk 37 is mounted in the upstream chamber 13 so that the blind holes 39 in the upstream disk are open to the remainder of the upstream chamber 13, i.e., the blind holes 39 extend into the upstream disk 37 from the face of the upstream disk 37 remote from the downstream disk 36. The diameter of the upstream disk 37 is about the same as the diameter of the downstream disk 36 and results in a space 54 between the outer circumference of the upstream disk 37 and the wall of the valve body 12 defining the upstream chamber 13.

Again with reference to FIGS. 1 and 2, the orifice valve 10 further comprises a generally cylindrical opening 26 between the upstream chamber 13 and the exterior of the valve body 12. The opening 26 has a diameter at least as great as the diameter of the upstream chamber 13 and is generally coaxial with the upstream chamber 13. A cover 27 having a generally cylindrical body 28 is mounted in the opening 26. The cover 27 comprises a flange 29 abutting the exterior of the valve body 12. The cover 27 has an axial bore 31 extending the length of the cover 27 coaxial with the opening 26 and the upstream chamber 13.

The cover 27 is rigidly attached to the valve body 12 by bolts 32 which extend through the flange 29 and are threaded into corresponding holes in the valve body 12.

The cover 27 has a pair of outer circumferential notches 33 along the length of its cylindrical body 28. O-rings 34 are positioned in the notches 33 between the valve body 12 and the body 28 of the cover 27 to prevent passage of fluid between the valve body 12 and the cover 27.

An operator member 42 is provided for rotating the upstream disk. The operator member 42 comprises a valve stem 43 extending through the axial bore 31 in the cover 27 into the upstream chamber 13. The valve stem 43 has a series of notches 44, each carrying an O-ring 46 to prevent passage of fluid between the valve stem 43 and the cover 27.

The operator member 42 further comprises a forked turning member 47 at the end of the valve stem 43 which extends into the upstream chamber 13. The forked turning member 47 has a pair of tines 48 which extend to a position adjacent the blind holes 39 in the upstream disk 37.

The end of each tine 48 has a flat face abutting the face of the upstream disk 37. Each tine 48 has a generally cylindrical blind hole 49 having a diameter about the same as the diameter of the blind holes 39 in the upstream disk 37. The forked turning member 47 is oriented so that the blind holes 49 of the tines 48 are in alignment with the blind holes 39 in the upstream disk 37. A pin 51 is positioned in each blind hole 39 of the upstream disk 37 and extends into the corresponding blind holes 49 of the tine 48. In this arrangement, when the forked turning member 47 is rotated, the upstream disk 37 rotates.

With reference to FIG. 5, each tine 48 of the forked turning member 47 comprises an undercut extension 56 extending into the space 54 between the valve body 12 and the upstream disk 37. There is a gap 57 between the upstream disk 37 and each undercut extension 56 into which an O-ring 58 is pressed. A lip 59 on each undercut extension 56 serves to maintain the O-ring 58 in place. The undercut extension 56 and O-ring 58 serve to retain the upstream disk 37 in position against the tines 48 to facilitate assembly of the valve.

The operator member 42 has a handle 61 attached to the end of the valve stem 43 extending out of the cover 27 and valve body 12. The handle 61 can be manually rotated resulting in rotation of the valve stem 43, forked turning member 47, and the upstream disk 37.

Graduated markings can be provided on the valve body or cover to indicate the position of the valve as the disk is rotated from a fully closed position to a fully open position.

The preceding description has been presented with reference to the presently preferred embodiment of the invention shown in the accompanying drawings. Workers skilled in the art and technology to which this invention pertains will appreciate that alterations and changes in the described structures can be practiced without meaningfully departing from the principles, spirit and scope of this invention.

For example, the upstream and downstream chambers have been described as having circular and oval cross-sectional configurations respectively. Other configurations, particularly for the downstream chamber, can be used.

Further, the upstream and downstream disks have been described as having about equal axial and radial dimensions. It is apparent that disks of differing dimensions can be used if desired. The disks, as well as the shoulder in the valve body and the operator member, are described as having two blind holes into which rigid pins are fitted. A single blind hole and pin may be sufficient. Likewise more than two blind holes and pins may be used. In such embodiments, the operator member would have other than two tines.

As another example, the tines need not have undercut extensions for holding the upstream disk during assembly. Because of the many variations of the invention which can be practiced, the foregoing description should not be read as pertaining only to the precise structures and procedures described, but rather should be read consistent with and as support for the following claims which are to have their fullest fair scope.

What is claimed is:

1. An orifice valve comprising:
  a valve body defining coaxial, adjoining upstream and downstream chambers, said upstream chamber having a generally cylindrical larger transverse cross-sectional area than the downstream chamber, the downstream chamber having an oblong transverse cross-section, to thereby form an annular shoulder having a generally circular outer perimeter defined by the configuration of the upstream chamber and a generally oblong inner perimeter defined by the configuration of the downstream chamber;
  a pair of diametrically opposite blind holes in the shoulder, each of the holes being generally at a position wherein the distance between the inner perimeter and the outer perimeter of the shoulder is at a maximum;
  a stationary downstream disk mounted in the upstream chamber against the shoulder comprising a pair of fluid openings through the downstream disk and a pair of blind holes, each of the holes being in direct communication with a blind hole in the shoulder;
  a rigid pin disposed in each blind hole in the shoulder of the valve body and extending into a directly communicating blind hole in the downstream disk to thereby prevent rotation of the downstream disk;
  a rotatable upstream disk mounted in the upstream chamber in face-to-face engagement with the downstream disk comprising a pair of fluid openings through the upstream disk which can be aligned with the fluid openings in the downstream disk and a pair of blind holes extending into the upstream disk from the face of the upstream disk remote from the downstream disk;
  an operator member for rotating the upstream disk comprising:
    a handle outside of the valve body;
    a stem fixedly attached to the handle and extending from the handle through the valve body and into the upstream chamber; and a disk engaging member fixedly attached to the stem having at least one surface adjacent the upstream disk and a pair of blind holes extending into the disk engaging member from said surface, each of the holes being in direct communication with a blind hole in the upstream disk; and a rigid pin disposed in each blind hole in the upstream disk and extending into a directly communicating blind hole in the disk engaging member.

2. An orifice valve as claimed in claim 1 further comprising a protective sleeve lining the downstream chamber.

3. An orifice valve as claimed in claim 2 wherein the orifice valve further comprises a generally cylindrical outlet port in communication with and coaxial to the downstream chamber and wherein the protective sleeve comprises an inner surface which provides generally smooth transition from a generally oblong transverse cross-sectional configuration adjacent the upstream chamber to a generally circular transverse cross-sectional configuration adjacent the outlet port.

4. An orifice valve comprising:
a valve body having a generally cylindrical upstream chamber, a downstream chamber having a generally oblong transverse cross-section adjoining and coaxial with the upstream chamber, and a shoulder between the upstream and downstream chambers having a generally circular outer perimeter defined by the upstream chamber and a generally oblong inner perimeter defined by the downstream chamber, and comprising a blind hole generally at each position wherein the distance between the inner and outer perimeters is at a maximum;

a stationary downstream disk having upstream and downstream faces comprising at least one fluid opening and a pair of blind holes extending into the downstream disk from the downstream face, said downstream disk being mounted in the upstream chamber against the shoulder, the blind holes in the downstream disk being in alignment with the blind holes in the shoulder;

a pair of rigid pins disposed in the blind holes in the shoulder and extending into the blind holes of the downstream disk to thereby prevent rotation of the downstream disk;

a rotatable upstream disk having upstream and downstream faces mounted in the upstream chamber in face-to-face engagement with the downstream disk comprising at least one fluid opening which can be aligned with the fluid opening of the downstream disk and a pair of blind holes extending into the upstream disk from the upstream face;

an operator member comprising:
a forked turning member in the upstream chamber having a pair of tines abutting the upstream disk, each tine comprising a blind hole aligned with one of the blind holes in the upstream disk;

a stem rigidly attached to the forked turning member and extending through the valve body to a position exterior of the valve body; and a handle attached to the end of the stem exterior of the valve body for rotating the stem and operator member; and a pair of rigid pins disposed in the blind holes in the upstream disk and extending into the blind holes of the tines so that rotation of the operator member results in rotation of the upstream disk.

5. An orifice valve as claimed in claim 4 wherein the downstream chamber is lined with a protective sleeve.

6. An orifice valve as claimed in claim 5 wherein the valve body further comprises a generally cylindrical outlet port in communication with and generally coaxial to the downstream chamber, and wherein the protective sleeve comprises an inner surface which provides a generally smooth transition from a generally oblong transverse cross-sectional configuration adjacent the upstream chamber to a generally circular transverse cross-sectional configuration adjacent the outlet port.

7. An orifice valve as claimed in claim 4 wherein the diameter of the downstream disk is less than the diameter of the upstream chamber thereby forming a groove between the outer circumference of the downstream disk and the surface of the valve body defining the upstream chamber and wherein the orifice valve comprises an O-ring positioned in the groove for forming a seal between the downstream disk and the valve body.

8. An orifice valve as claimed in claim 7 wherein the diameter of the downstream face of the downstream disk is greater than the upstream face of the downstream disk so that the groove converges toward the shoulder.

9. An orifice valve as claimed in claim 4 wherein the operator member further comprises means for retaining the upstream disk against the tines during assembly of the valve.

10. An orifice valve as claimed in claim 9 wherein the diameter of the upstream disk is less than the diameter of the upstream chamber thereby forming a space between the outer circumference of the upstream disk and the wall of the valve body defining the upstream chamber and wherein the means for retaining the upstream disk against the tines comprises an undercut extension extending from each tine into the space between the wall of the valve body and the outer circumference of the upstream disk for holding the upstream disk at two positions about its outer circumference.

11. An orifice valve as claimed in claim 10 wherein a gap is formed between each undercut extension and the outer circumference of the upstream disk and wherein the means for retaining the upstream disk against the tines further comprises an O-ring pressed into said gaps to thereby retain the upstream disk against the tines.

12. An orifice valve as claimed in claim 11 wherein each undercut extension comprises a lip for preventing slippage of the O-ring out of the gaps.

13. An orifice valve comprising:
a valve body defining coaxial, adjoining upstream and downstream chambers, said upstream chamber having a larger transverse cross-sectional area than the downstream chamber to thereby form a shoulder at the junction of the upstream and downstream chambers, wherein the upstream chamber is generally cylindrical in transverse cross section and the downstream chamber has a transistion from an oblong transverse cross section at its upstream end to a circular cross section at its downstream end, said shoulder comprising a pair of diametrically opposite blind holes;

a stationary downstream disk mounted in the upstream chamber with a pair of blind holes in alignment with the blind holes in the shoulder and a pair of fluid openings through the downstream disk on a different diameter from the diameter on which the blind holes are located;

a rigid pin disposed in each hole in the shoulder of the valve body and extending into the aligned blind hole in the downstream disk to thereby prevent rotation of the downstream disk;

a rotatable upstream disk mounted in the upstream chamber in face-to-face engagement with the downstream disk comprising a pair of fluid openings through the upstream disk which can be aligned with the fluid openings in the downstream disk and a pair of blind holes extending into the upstream disk from the face of the upstream disk remote from the downstream disk, the upstream and downstream disks being substantially identical;

an operator member in the upstream chamber for rotating the upstream disk and having a pair of blind holes aligned with the blind holes in the upstream disk; and a rigid pin disposed in each blind hole in the upstream disk and extending into the aligned blind hole in the operator.

14. An orifice valve comprising:

a valve body defining coaxial, adjoining upstream and downstream chambers, said upstream chamber having a larger transverse cross-sectional area than the downstream chamber to thereby form a shoulder at the juncture of the upstream and downstream chambers, wherein the shoulder is annular and has a generally circular outer perimeter defined by the configuration of the upstream chamber and a generally oblong inner perimeter defined by the configuration of the downstream chamber;

a pair of diametrically opposite blind holes in the shoulder, each hole being generally at a position wherein the distance between the iner perimeter and the outer perimeter of the shoulder is at a maximum;

a stationary downstream disk mounted in the upstream chamber with a pair of blind holes in alignment with the blind holes in the shoulder and a pair of fluid openings through the downstream disk on a different diameter from the diameter on which the blind holes are located;

a rigid pin disposed in each blind hole in the shoulder of the valve body and extending into the aligned blind hole in the downstream disk to thereby prevent rotation of the downstream disk;

a rotatable upstream disk mounted in the upstream chamber in face-to-face engagement with the downstream disk comprising a pair of fluid openings through the upstream disk which can be aligned with the fluid openings in the downstream disk and a pair of blind holes extending into the upstream disk from the face of the upstream disk remote from the downstream disk, the upstream and downstream disks being substantially identical;

an operator member in the upstream chamber for rotating the upstream disk and having a pair of blind holes aligned with the blind holes in the upstream disk; and a rigid pin disposed in each blind hole in the upstream disk and extending into the aligned blind hole in the operator.

15. An orifice valve comprising:

a valve body defining coaxial, adjoining upstream and downstream chambers, said upstream chamber having a larger transverse cross-sectional area than the downstream chamber to thereby form a shoulder at the juncture of the upstream and downstream chambers, said shoulder comprising a pair of diametrically opposite blind holes;

a stationary downstream disk mounted in the upstream chamber with a pair of blind holes in alignment with the blind holes in the shoulder and a pair of fluid openings through the downstreak disk on a different diameter from the diameter on which the blind holes are located;

a rigid pin disposed in each blind hole in the shoulder of the valve body and extending into the aligned blind hole in the downstream disk to thereby prevent rotation of the downstream disk;

a rotatable upstream disk mounted in the upstream chamber in face-to-face engagement with the downstream disk comprising a pair of fluid openings through the upstream disk which can be aligned with the fluid openings in the downstream disk and a pair of blind holes extending into the upstream disk from the face of the upstream disk remote from the downstream disk, the upstream and downstream disks being susbtantially identical;

an operator member in the upstream chamber for rotating the upstream disk and having a pair of blind holes aligned with the blind holes in the upstream disk;

a rigid pin disposed in each blind hole in the upstream disk and extending into the aligned blind hole in the operator; and a protective sleeve lining the downstream chamber, the protective sleeve having a passage therethrough that is oblong at its upstream end and circular at its downstream end with a smooth transition therebetween.

16. An orifice valve comprising:

a valve body comprising adjoining upstream and downstream chambers and a shoulder at the juncture of the upstream and downstream chambers;

a stationary downstream disk mounted in the upstream chamber against the shoulder, said downstream disk having a pair of fluid openings therethrough;

a pair of blind holes in the shoulder, a pair of blind holes in the downstream disk aligned with the holes in the shoulder and pins in said aligned holes for preventing rotation of the downstream disk;

a rotatable upstream disk mounted in the upstream chamber in face-to-face engagement with the downstream disk, said upstream disk having a pair of fluid openings therethrough which can be aligned with the fluid openings in the downstream disk; and a disk operating member mounted in the upstream chamber for rotation from outside the valve body, a pair of blind holes in the disk operating member, a pair of blind holes in the upstream disk aligned with the holes in the disk operating member, and pins in said aligned holes for connecting rotation of the disk operating member to the upstream disk for rotating the upstream disk; and wherein the downstream chamber has an oblong transverse cross section at its upstream end adjacent the openings through the downstream disk and the holes in the shoulder are adjacent to the narrow part of the oblong cross section.

17. An orifice valve as claimed in claim 16 wherein the orifice valve further comprises a generally cylindrical outlet port in communication with and coaxial to the downstream chamber and protective sleeve in the downstream chamber with an inner surface which provides a transition from the generally oblong transverse cross-section adjacent the downstream disk to a generally circular transverse cross-section adjacent the outlet port.

18. An orifice valve as claimed in claim 16 wherein the diameter of the downstream disk is less the diameter of the upstream chamber thereby forming a groove between the outer circumference of the downstream disk and the surface of the valve body defining the upstream chamber and wherein the orifice valve comprises an O-ring positioned in the groove for forming a seal between the downstream disk and the valve body.

19. An orifice valve as claimed in claim 18 wherein the groove converges toward the shoulder.

* * * * *